Oct. 13, 1964     T. STARK     3,152,600
COLLAPSIBLE CANOPY
Filed Dec. 1, 1960     3 Sheets-Sheet 1
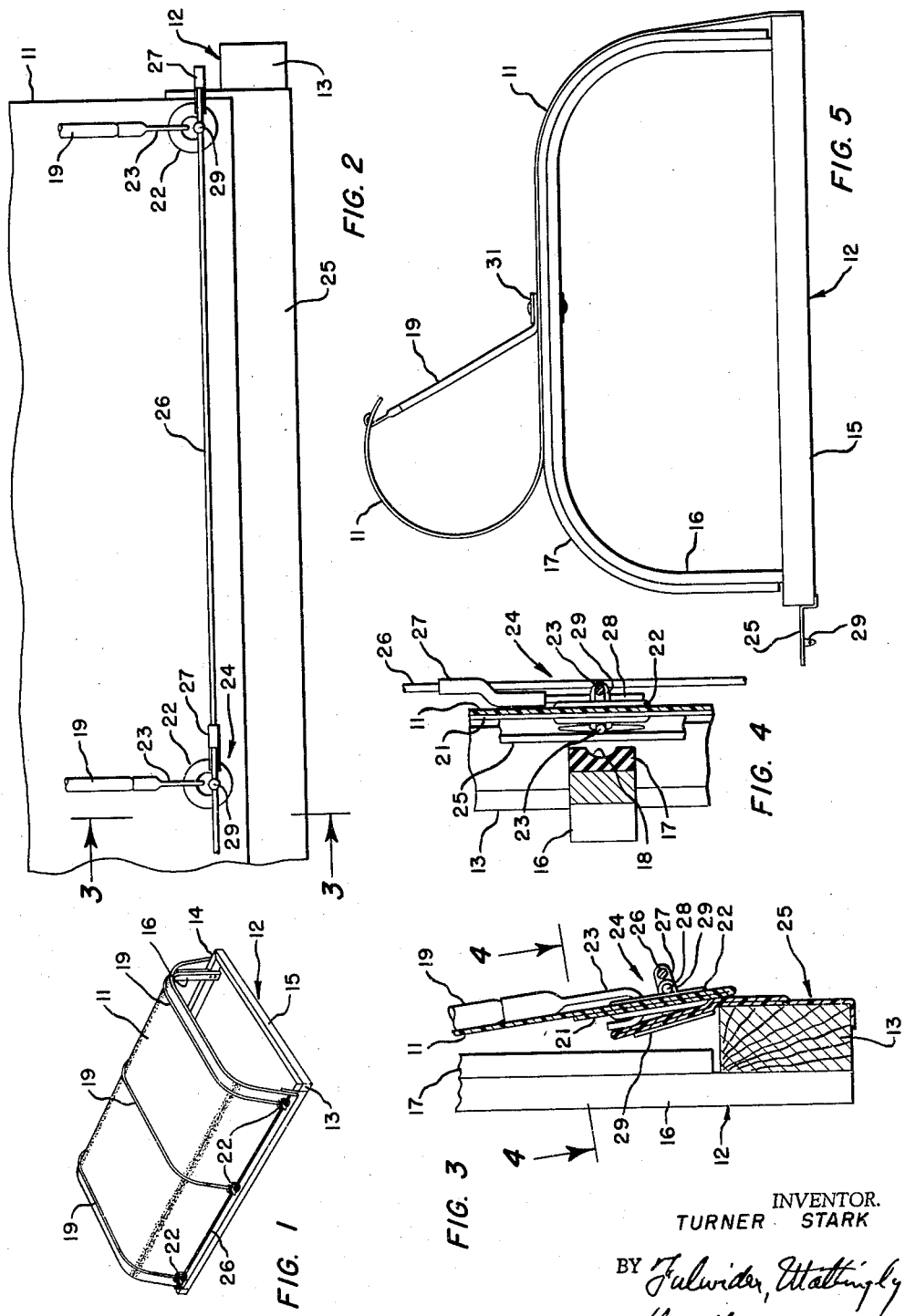
INVENTOR.
TURNER STARK
BY *Fulwider, Mattingly*
*and Huntley* ATTORNEYS Oct. 13, 1964     T. STARK     3,152,600
COLLAPSIBLE CANOPY Filed Dec. 1, 1960     3 Sheets-Sheet 2

INVENTOR.
TURNER STARK

BY Fulwider, Mattingly
& Huntley
ATTORNEYS

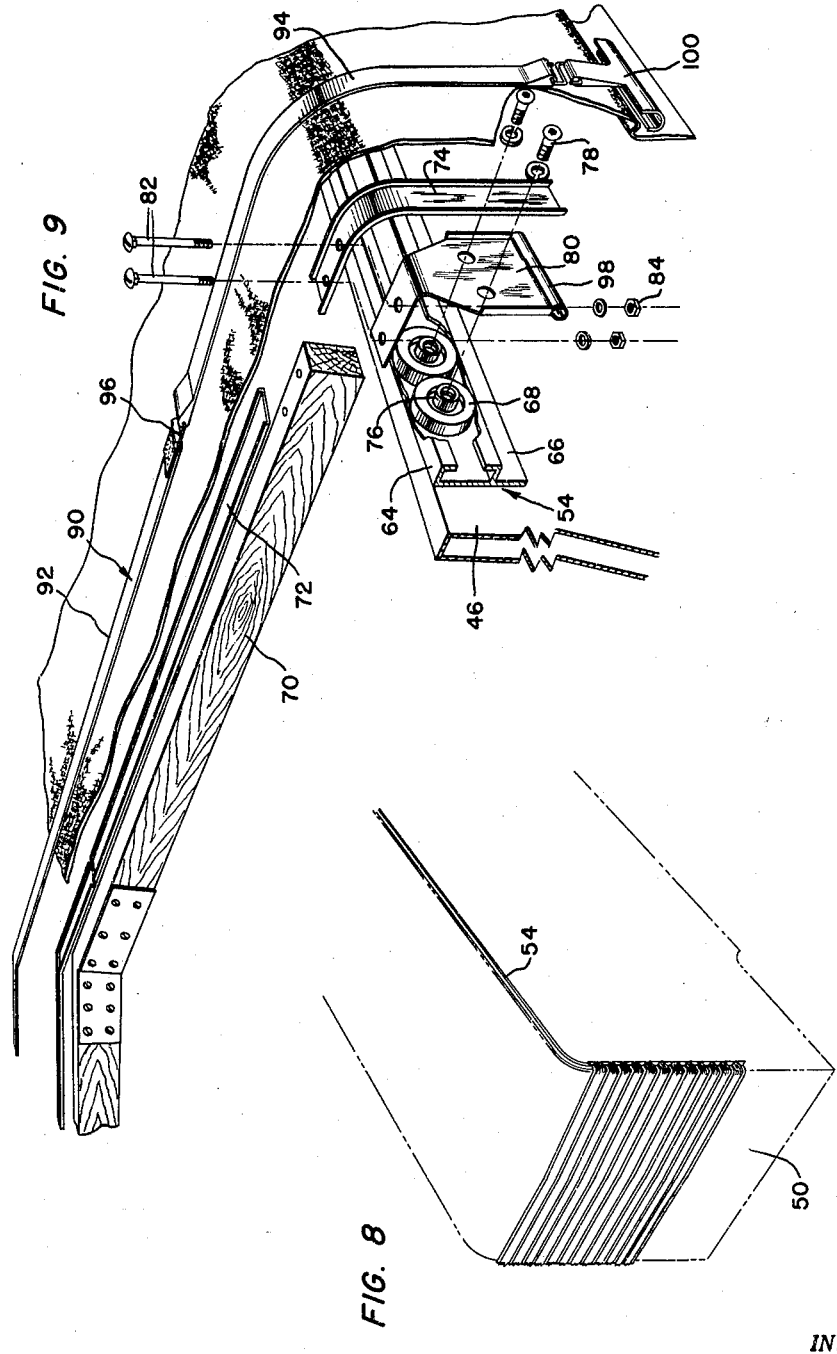

United States Patent Office 3,152,600
Patented Oct. 13, 1964

1

3,152,600
COLLAPSIBLE CANOPY
Turner Stark, 534 Guava, Chula Vista, Calif.
Filed Dec. 1, 1960, Ser. No. 73,148
17 Claims.  (Cl. 135—5)

The present invention relates to supports for canopies, and more particularly relates to apparatus for rapidly and expeditiously shifting or removing the canopy from an overhead covering position to a non-covering position and vice versa. The present application is a continuation-in-part of the abandoned application Serial No. 723,228, filed March 24, 1958.

Various means have heretofore been proposed for shifting or removing the coverings or canopies of shelters and vehicles, as for example, in military installations wherein fixed and mobile gun and missile batteries are commonly camouflaged or concealed by an overhead covering of some sort. Such a covering obviously must be very quickly shifted or removed from an overhead position to permit the guns thereby concealed to be trained upon rapidly approaching aircraft or other targets. Likewise if coverings and tarpaulins for troop and canopies for cargo carriers such as trucks were readily shiftable or removable, the loading and unloading of such carriers would be greatly speeded and simplified. In structures such as tents, which shelter many hundreds of people the covering should also be quickly shiftable or removable to permit rapid exit of the people in the event of a fire or other emergency, and this desideratum is of particular value when the covering itself is on fire. Various other areas of application for the present device will become apparent to those skilled in the art, and, accordingly, the examples above cited are not intended to be exhaustive, but rather are intended to be merely suggestive.

Accordingly, the apparatus of the present invention comprises a simple and straightforward arrangement of elastic cords or straps stretched upon a supporting frame which is fitted over with a covering. At one end the cords are securely fixed to one side of the frame, and at the other ends they are detachably secured to the opposite side of the frame.

In one aspect of the invention, cords are so coupled to this latter side of the frame, that upon the actuation of a triggering means, the cords are permitted to whip back and over the shelter frame, carrying the covering with them to thereby uncover the shelter frame.

In another aspect of the invention, the covering, forming a canopy, is draped over a plurality of parallelly arranged bows which are spaced from one another, as for example lengthwise of a truck frame, the bows being shiftable in the lengthwise direction of the track. Guides are provided for the bows in the form of rails disposed along opposite sides of the truck frame. In this embodiment, the elastic cords or straps are utilized for clamping the canopy or covering to the bows and for releasably fastening the bows to the frame so as to releasably retain the bows in spaced canopy supporting position.

In addition to the objects and features already discussed above, many other objects and features of the present invention will be readily apparent to those skilled in the art from the following specification and appended drawings wherein are illustrated preferred forms of the invention, and in which:

In the drawings:

FIG. 1 is a perspective view of one aspect of the covering removal apparatus of the present invention;

FIG. 2 is a partial side elevational view of the apparatus of FIG. 1, illustrating in particular the release or triggering means for effecting separation between the covering and the shelter;

2

Figure 6:
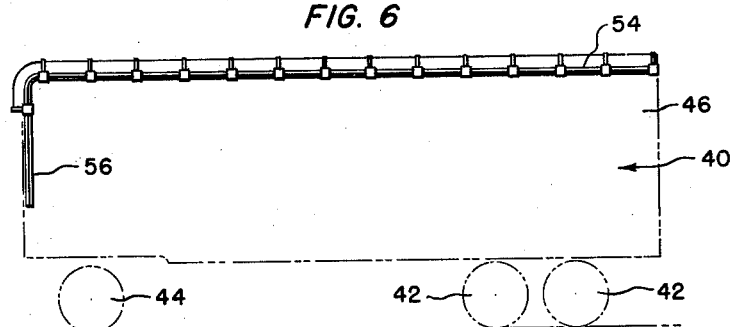
Figure 7:
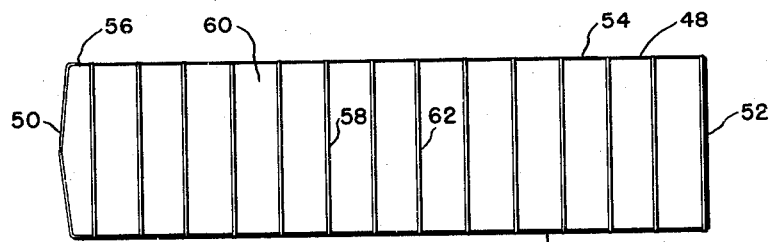
Figures 10, 11, 12:
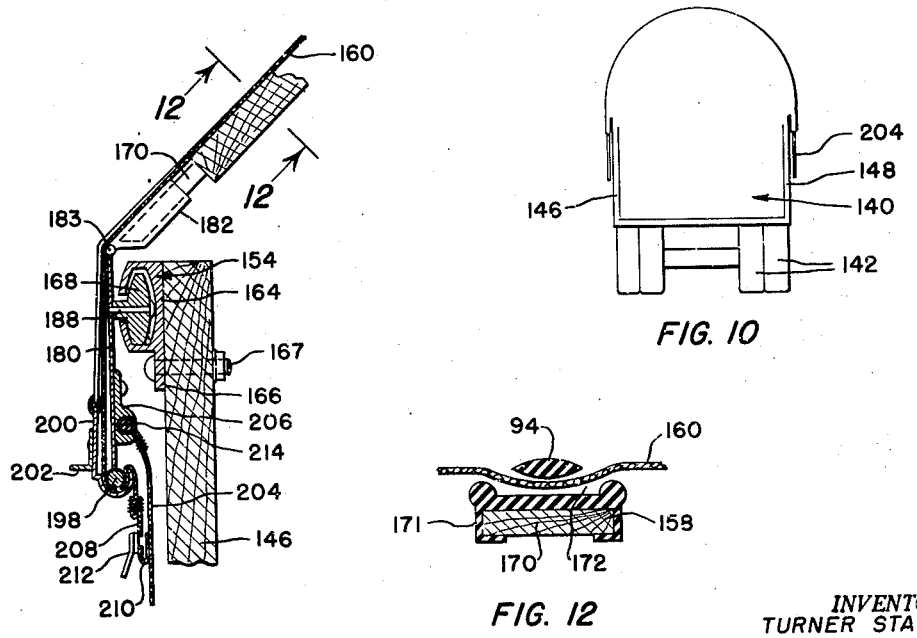

FIG. 3 is a view taken along line 3—3 of FIG. 2;

FIG. 4 is a view taken along line 4—4 of FIG. 3;

FIG. 5 is an end elevational view of another embodiment of the apparatus of the present invention;

FIG. 6 is a side view of a truck, showing one aspect of the present invention applied thereto;

FIG. 7 is a top plan view of the truck shown in FIG. 6;

FIG. 8 is a perspective view of the front portion of the truck shown in FIGS. 6 and 7;

FIG. 9 is a fragmentary, exploded view in perspective of a rail, showing how the bows are carried thereby and showing details of the bow, the elastic strap and the fastening mechanism for holding the bows and canopy in position;

FIG. 10 is an end view of a truck showing still another aspect of the invention;

FIG. 11 is a fragmentary view showing further details of the bow and fastening mechanism, and showing the rail in cross section; and FIG. 12 is a fragmentary cross-sectional view taken along line 12—12 of FIG. 11.

Referring to the drawings and more particularly to FIGS. 1 through 4, there is illustrated an embodiment of the covering removal apparatus of the present invention which is particularly adapted for effecting the removal of a flexible screening, tarpaulin, or covering or canopy 11 from a supporting frame 12.

Frame 12 is not intended to designate any particular structure, but rather may be taken to be exemplary of many things, such as a shelter frame, a tent frame, a vehicle or truck frame, or the supporting frame of a gun or missile emplacement. Frame 12 preferably includes a longitudinally extending front side 13, a similar rear side 14 extending coextensively with side 13, and a pair of transversely disposed end members 15 which are secured at their ends to the ends of elements 13 and 14, respectively, to form a closed rectangular frame within which is defined a shelter area. It is within this shelter area that a fixed missile or gun emplacement could be located, or, in the case of a frame carried upon the rear of a truck, within which troops or cargo could be located. In addition, a plurality of arches or bows, in the form of inverted U-shaped elements 16 are disposed at regularly spaced intervals along the length of sides 13 and 14, and, for a frame 12 of moderate length such as that illustrated, there is a bow 16 at either end of elements 13 and 14, and a bow 16 located midway therebetween.

The depending ends of bows 16 are rigidly secured, as by bolting or nailing, to the inner faces of sides 13 and 14, as illustrated. To the outer side of each of bows 16 is secured a cable or cord receiving track 17 which extends along substantially the complete length of its associated bow 16 and serves to receive in a groove 18 thereof a bias means or elastic shock element in the form of a cord 19. The function of the grooves 18 is to form a carrier groove for each of the cords 19 to thereby prevent displacement of the covering and prevent side movement or slippage of such cords, bow 16 serving to support the cords 19 in their normal or stretched condition.

In its normal location, the covering 11 is rigidly secured at one of its longitudinal edges to the outer face of rear side 14 along the length thereof. Covering 11 is draped upwardly and over the U-shaped bows 16, and thence downwardly toward front side 13. The loose or free edge of covering 11 is doubled back upon itself to form a reinforcing strip 21, FIG. 3, through which a plurality of eyelets or grommets 22 are secured, a grommet 22 being provided for each of the shock cords 19.

Each shock cord 19 is securely fixed at one end to rear side 14 of frame 12, and in its stretched condition is carried over the covering 11, and fits against the grooves 18 of tracks 17. The other or free end of each cord 19 is provided with a usual and conventional hook 23 which is suitably pressed or adhered to the end of the cord 19. Hooks 23 normally fit through the central openings in the grommets 22, and thus it will be seen that if the free end margin of covering 11 is not normally suitably restrained or maintained in close proximity to front side 13, the elastic quality of cords 19 will cause cords 19 to whip upwardly and back over bows 16, carrying the covering 11 with them and thereby quickly uncovering the inner area defined by frame 12.

The means for normally holding the free margin of covering 11 in position is provided by a hand actuated releasable retaining means 24 which detachably secures covering 11 to a lower covering strip 25. Retaining means 24 includes a lanyard or cable 26 which extends along the length of the free edge of covering 11 and is provided with a plurality of bayonet fixtures 27, one at each of the locations of grommets 22. As best seen in FIG. 4, each fixture 27 is formed of a hollow sleeve portion which is fixedly crimped or adhered to cable 26, and is offset and extended longitudinally to fixedly receive a retaining member in the form of a pin or bayonet 28 in its end. The bayonets 28 are retractably inserted in slidable relation into the central apertures or eyes of a corresponding number of engaging or retainer elements 29.

Retainer elements 29 each embody a protruding portion which is apertured as just described and within which a bayonet 28 is normally receivable. Each element 29 also embodies an integral flattened backing portion which is carried on the inner side of covering strip 25. This backing portion is suitably bonded or adhered to the inner side of covering strip 25, and by its comparatively large area prevents the associated bayonet 28 from tearing the element 29 through the small opening in strip 25 through which the apertured portion of element 29 protrudes. In this respect it is noted that covering strip 25 is also firmly fixed in position, being rigidly secured along the outer face and a portion of the underside of front element 13. In addition, strip 25 extends upwardly and is doubled back upon itself, as best illustrated in FIG. 3, to form a double strength upper strip section for carrying and supporting the plurality of retainer elements 29. It is to be noted that the lower edge of the protruding portion of retainer element 29 is preferably formed so that it is disposed at an angle to the plane of the inner peripheral face of the opening of grommet 22. With this construction it will be apparent that grommet 22 will slide upwardly and outwardly from retainer element 29 under the bias of cords 19 at such time as release mechanism 24 is operated.

In operation, release mechanism 24 is operated by grasping and pulling one end of cable 26, thereby simultaneously withdrawing all bayonets 28 from the openings in retainer elements 29. The bias of elastic cords 19 then pulls grommets 22 off retainer elements 29, and quickly and simply hurls covering 11 upwardly and over frame 12 to that side of frame 12 opposite covering strip 25. In FIG. 5 is illustrated a second embodiment of the invention in which the covering 11 is thrown back along only approximately one-half of its transverse length. This is accomplished by providing a plurality of rivet assemblies 31, one at each member 16, which are disposed through and serve to secure together cords 19, covering 11, tracks 17 and members 16.

The reattachment of covering 11 to covering strip 25 is equally straightforward. Covering 11 is first draped in position over members 16 and the grommets 22 thereof fitted over the retainer elements 29. Next the bayonets 28 are reinserted into elements 29 and then cords 19 are restretched upon tracks 17 until the hooks 23 thereof can be inserted through the openings in grommets 22.

Thus it will be apparent that there has been provided by the covering removal apparatus of the present invention a means for simply and rapidly effecting the uncovering of a previously sheltered area. The apparatus employs a minimum of parts and is particularly adapted to economical manufacture.

Referring now to the aspect of the invention shown in FIGS. 6 to 9 inclusive, the frame is in the form of a truck body 40 which is carried by two pairs of rear wheels 42 and a pair of front wheels 44. The frame includes side walls 46 and 48, a front wall 50 and a rear wall 52. Each of the side walls 46 and 48 carries a rail 54. These rails extend longitudinally throughout the length of the side walls and then are provided with downwardly extending portions 56. These rails carry a plurality of inverted U-shaped arches or bows 58. A covering or canopy 60 is draped over these bows and is held in place by elastic straps or cords 62.

The rails and bows are more clearly shown in FIG. 9. The rails 54–56 comprise C-shaped channels 64 having depending flanges 66. These rails are suitably secured to the side walls 46 and 48. Rollers 68 ride within the rails 54. These rollers carry the bows 58, two rollers being attached to each end of a bow 58.

The bow preferably comprises a wooden or flexible plastic batten 70, the top side of which carries a longitudinally disposed channel or groove member 72 which may be formed of sheet metal. This sheet metal extends outwardly over the rail and may be formed of a separate piece as is shown at 74. The rollers are provided with hubs 76 which ride upon bearings 78. These bearings 78 are carried by an inverted U-shaped plate 80. The channel members 72 and 74 and the plate 80 are secured to one another by bolts 82 and nuts 84.

The canopy 60 is draped over these bows and is held in place by straps 90 which may comprise the main section 92 which is formed of an intermediate cotton webbing section and two elastic, opposite end sections 94 formed of resilient rubber. These straps 92 and 94 are connected with one another by buckles 96. These straps force the canvas canopy into the channels or grooves in the channel shaped members 72 and 74.

The lower ends of the plates 80 are rounded as shown at 98, and the lower ends of the straps 94 are connected with hook shaped brackets 100. These hook shaped brackets are hooked over the rounded end 98 with the canvas canopy clamped therebetween. At this time the elastic straps 94 are in stretched or biasing condition. From the foregoing it will be seen that the straps in cooperation with the grooves or channels in the member 72 hold the canvas canopy clamped against the bows, and that the elements or brackets 100, together with members 98, provide hand actuatable releasable retaining means for removably retaining the elastic elements in resilient relationship with the bows with the canopy pressed into a plurality of grooves.

The front and rear ends of the canopy are suitably fastened to the front and rear walls of the truck by any desired releasable means (not shown). When it is desirable to shift the canopy from its covering position, the rearward releasing means are actuated and then the bows are progressively moved forwardly. The canvas then collapses in accordion fashion. If it is desirable to completely uncover the truck, the front releasing means are also actuated whereby the bows, carrying the canvas in accordion fashion, can be moved downwardly along the rail sections 56 to the position shown in FIG. 8.

Referring now to the aspect of the invention shown in FIGS. 10, 11 and 12, there the frame is shown as a truck body 140, the rear wheels being shown at 142. In this embodiment the side walls 146 and 148 do not extend as high as in the embodiment shown in FIG. 6, but the bows are substantially semicircular in shape. Here again there is employed two rails 154 which extend longitudinally of the side walls and are provided with C-shaped channel portions 164 and downwardly extending flanges 166 which are fastened to the side walls by bolts 167. These rails carry rollers 168 mounted on bearings 188, and these bearings are in turn fastened to a to said front element, said releasable retainer means including a plurality of retaining elements adapted to be releasably coupled to said opposite edge of said canopy, said releasable retaining means including a plurality of members movable in one direction to engage said retaining elements to secure said retaining elements against release from said opposite edge of said canopy, each of said plurality of retaining members being engageable with a separate one of said plurality of retaining elements and movable in the opposite direction to disengage said retaining elements to permit said retaining elements to be released from engagement with said opposite edge of said canopy, said releasable retaining means including means coupled to each of said plurality of retaining members and operable to simultaneously move each said plurality of retaining members in said opposite direction to completely disengage each of said plurality of retaining members from each of said plurality of retaining elements at the same time to thereby permit the elasticity of said elastic elements to retract said canopy from said front element.

11. The combination as defined in claim 10, wherein said frame includes support members connected between said front element and said rear element, and wherein said elastic elements are a plurality of elastic cords adapted to be secured to said opposite edge of said canopy, stretched over said covering and secured at their other ends to the support members at points intermediate said front element and said rear element.

12. A combination including a frame having rails along opposite sides thereof and extending longitudinally of the frame; a plurality of substantially parallelly arranged bow elements disposed in spaced relationship transversely of the rails; a single flexible canopy draped over a plurality of said bow elements; means carrying said bow elements and guided by the rails; elastic fastening strap elements, each overlying the canopy above a bow element, said bow elements and said elastic elements being arranged in pairs, and one element of each of said pairs of elements having a longitudinally extending groove, the open side of the groove confronting the other element of a pair of elements; and hand actuated releasable retaining means for removably retaining the elastic elements in resilient clamping relationship with the bow elements with the canopy pressed into the groove.

13. The combination as defined in claim 12, in which the means for carrying the bow elements includes rollers, one roller on each end of each of the bow elements.

14. A combination including a frame having rails along opposite sides thereof and extending longitudinally of the frame; a plurality of substantially parallelly arranged bows disposed in spaced relationship transversely of the rails; a single flexible canopy draped over a plurality of said bow elements; means carrying said bow elements and guided by the rails; elastic fastening straps each overlying the canopy above the bows, said bows and straps being arranged in pairs; and hand actuated releasable retaining means for removably retaining the elastic straps in resilient clamping relationship with the bows with the canopy pressed against the bows, including releasable fasteners between each of the straps and the bows, said releasable fasteners being held in fastening position by a force produced by elastic elongation of the straps.

15. The combination as defined in claim 14, in which the means for carrying the bows includes rollers, one roller on each end of a bow.

16. The combination as defined in claim 8, wherein said elastic elements are a plurality of elastic cords adapted to be stretched over said canopy and secured to said one edge and said opposite edge of said canopy.

17. The combination as defined in claim 8, wherein said elastic elements are provided with hooks removably engaged with said apertures formed in said opposite edge of said canopy.

References Cited in the file of this patent

UNITED STATES PATENTS

| 905,571 | Pangborn | Dec. 1, 1908 |
| 1,263,759 | Hanaway | Apr. 23, 1918 |
| 2,679,254 | Green | May 25, 1954 |
| 2,827,138 | Roy | Mar. 18, 1958 |

FOREIGN PATENTS

| 61,393 | Netherlands | Feb. 18, 1948 |

OTHER REFERENCES

Publication: Gro-Mor Adv., 287, August 1960 (Lord & Burnhan Corp., copy available in Div. 20).

plate 180. An upwardly extending socket 182 is hinged at 183 onto the upper end of plate 180. These sockets 182 receive the lower ends of the battens 170. Each of these battens forms a part of the bow 158 and may be semicircular in shape or disposed at an angle as shown in FIG. 11. These battens are covered at the top and sides by a channel shaped extruded rubber strip 171. These extruded strips 171 are provided with a channel or groove 172.

The canvas canopy 160 is draped over these bows and pressed into the grooves 172 by the strap 90, each including the two elastic end sections 94. Again each of these straps is provided with a bracket type hook 200 and these hooks are hooked over the lower rounded ends 198 of the plates 180. These hooks may be provided with projections 202 providing handles for manipulating the hooks.

Like in the aspect of the invention shown in FIGS. 6 to 9 inclusive, the bows can be pushed toward one another with the canvas canopy collapsing in accordion fashion whereby the truck can be substantially fully uncovered.

If desirable, downwardly extending curtains or aprons 204 may be provided and which may be used for covering the sides of the truck in case some are formed of lattice or open work. The upper ends of these aprons are suitably removably attached to brackets 206 which are carried on the inner side of the plates 180. These aprons may also be connected with the lower end of the canopy 160 by extensions 208 and 210 fastened by sewing, respectively, to the lower end of the canopy 160 and the outside of the curtain 204. The extensions 208 and 210 are connected to one another through a hookless fastener 212 which extends longitudinally throughout the length of the apron. When the canopy is collapsed, the aprons are likewise collapsed in accordion fashion. If the aprons are not necessary, they can be omitted or removed. The upper edge of the apron is provided with a compressible section 214 therealong by which it can be readily attached or detached with brackets 206. By unfastening the extension 208 from the section 210, the apron can be removed without disturbing the canopy.

The upper ends or sections of the aprons are disposed between the canopy and frame, and the upper edges of the aprons are disposed at a higher plane than the lower edges of the canopy. Such construction provides for preventing dust, dirt and rain, and splashing mud from entering the interior of the truck from the sides thereof.

Thus it is apparent from the foregoing that there has been provided a simple mechanism for rapidly effecting the shifting of the canopy from either its collapsed to its covering position or vice versa.

While certain preferred embodiments of the invention have been specifically disclosed, it is understood that the invention is not limited thereto as many variations will be readily apparent to those skilled in the art, and the invention is to be given its broadest possible interpretation within the terms of the following claims.

I claim:

1. A combination including a frame having a plurality of substantially parallelly arranged bow elements; a single flexible canopy draped over a plurality of said bow elements; elastic fastening strap elements, each overlying the canopy above a bow element, said bow elements and said elastic elements being arranged in pairs, and one element of each of said pairs of elements having a longitudinally extending groove, the open side of the groove confronting the other element of a pair of elements; and hand actuated releasable retaining means for removably retaining the elastic elements in resilient clamping relationship with the bow elements with the canopy pressed into a plurality of the grooves.

2. The combination as defined in claim 1, in which the bow elements are provided with the grooves.

3. The combination as defined in claim 1, in which the elastic elements are formed of straps of resilient rubber.

4. The combination as defined in claim 1, in which the elastic elements are formed of straps of resilient rubber and in which the bow elements are provided with the grooves.

5. The combination as defined in claim 1, and including aprons on opposite sides of the frame, the upper ends of said aprons being disposed between the frame and the lower ends of the canopy, the upper edge of the aprons being disposed at a higher level than the lower edge of the canopy; and means for attaching the aprons to the bows.

6. The combination as defined in claim 1, and including aprons on opposite sides of the frame, the upper ends of said aprons being disposed between the frame and the lower ends of the canopy, the upper edge of the aprons being disposed at a higher level than the lower edge of the canopy; and means for removably attaching the aprons to the canopy.

7. The combination as defined in claim 1, and including releasable fasteners between each of the elastic elements, and the bow elements.

8. The combination as defined in claim 1, in which the frame over which said canopy is draped includes a rear element to which one edge of said canopy is rigidly secured and a front element toward which the opposite edge of said canopy is extended; retainer means secured to said front element, said retainer means including a plurality of apertured protruding portions disposed through apertures formed in said opposite edge of said canopy, said hand actuated releasable retaining means including pins releasably disposed through the apertures of said protruding portions, each of said pins being disposed through a separate one of said apertures of said protruding portions for maintaining said canopy in position over said protruding portions, and said releasable retaining means including means connecting together said pins and actuable to completely withdraw each of said pins from each of said apertures of said protruding portions at the same time to thereby permit the elasticity of the elastic elements to rapidly retract said canopy away from said front element.

9. The combination as defined in claim 1, in which the frame over which said canopy is draped, includes a rear element to which one edge of said canopy is rigidly secured and a front element toward which the opposite edge of said canopy is extended, said bow elements being connected between said front element and said rear element for supporting said canopy to form a sheltered interior, said hand actuated releasable retainer means including means secured to said front element, said last mentioned means including a plurality of apertured protruding portions disposed through grommets carried in said opposite edge of said canopy, said hand actuated releasable retaining means including pins releasably disposed through the apertures of said protruding portions and maintaining said canopy in position over said protruding portions, said elastic elements being secured at their ends to said one edge and said opposite edge of said canopy, said releasable retaining means including means connecting together said pins and actuable to simultaneously withdraw said pins from said apertures of said protruding portions to thereby permit the elasticity of said elastic elements to rapidly retract said canopy away from said front element and uncover said sheltered interior.

10. The combination as defined in claim 1, in which the frame over which said canopy is draped includes a rear element to which one edge of said canopy is rigidly secured and a front element toward which the opposite edge of said canopy is extended, said elastic elements being connected to and tending to urge said opposite edge of said canopy away from said front element, said hand actuated releasable retainer means being secured